(12) United States Patent
Chen et al.

(10) Patent No.: US 10,498,136 B2
(45) Date of Patent: Dec. 3, 2019

(54) METHOD AND DEVICE FOR RADIO FREQUENCY VOLTAGE LIMITING

(71) Applicant: Huawei International Pte., Ltd., Singapore (SG)

(72) Inventors: Xuesong Chen, Singapore (SG); Rui Yu, Singapore (SG); Theng Tee Yeo, Singapore (SG); Lee Guek Doreen Yeo, Singapore (SG)

(73) Assignee: Huawei International Pte., Ltd., Singapore (SG)

( * ) Notice: Subject to any disclaimer, the term of this patent is extended or adjusted under 35 U.S.C. 154(b) by 254 days.

(21) Appl. No.: 15/692,799

(22) Filed: Aug. 31, 2017

(65) Prior Publication Data

US 2018/0062385 A1    Mar. 1, 2018

(30) Foreign Application Priority Data

Sep. 1, 2016    (SG) .......................... 10201607275Y

(51) Int. Cl.
| | |
|---|---|
| *H02H 9/04* | (2006.01) |
| *H02H 1/00* | (2006.01) |
| *H04L 27/02* | (2006.01) |

(52) U.S. Cl.
CPC ............ *H02H 9/04* (2013.01); *H02H 1/0007* (2013.01); *H04L 27/02* (2013.01)

(58) Field of Classification Search
CPC ......... H02H 9/04; H02H 1/0007; H04L 27/02
(Continued)

(56) References Cited

U.S. PATENT DOCUMENTS

| 2006/0198197 A1 | 9/2006 | Ku et al. |
| 2007/0058308 A1* | 3/2007 | Thijs ...................... H03F 1/223 |
| | | 361/56 |

(Continued)

FOREIGN PATENT DOCUMENTS

| EP | 1964032 A1 | 9/2008 |
| EP | 2860667 A1 | 4/2015 |

(Continued)

OTHER PUBLICATIONS

Darwhekar et. al., "A 45nm CMOS Near-Field Communication Radio with 0.15A/m RX Sensitivity and 4mA Current Consumption in Card Emulation Mode," ISSCC 2013 / Session 25 / Energy-Efficient Wireless / 25.1, pp. 440-442, Institute of Electrical and Electronics Engineers, New York, New York (Feb. 2013).

(Continued)

*Primary Examiner* — Dharti H Patel
(74) *Attorney, Agent, or Firm* — Leydig, Voit & Mayer, Ltd.

(57) ABSTRACT

The embodiments of the invention provide a method and device for radio frequency (RF) limiting. The device for RF limiting comprises: an analog limiter configured to limit a voltage of a RF input to a predetermined safe range during power-off or power-up until a disable control signal is received from the digital controller, a sensing circuit configured to sense a plurality of shunting currents provided by the analog limiter in sequence to determine a value of each bit of a preset current sensing code and sense the limiting voltage, a digital controller configured to control the digital limiter to perform RF limiting function based on the value of each bit of the preset current sensing code, and control the analog limiter to stop limiting the voltage of the RF input if the limiting voltage is within a predetermined acceptable voltage range.

16 Claims, 6 Drawing Sheets

(58) Field of Classification Search
USPC .................. 361/93.1–93.9, 91.1–91.9, 111
See application file for complete search history.

(56) References Cited

U.S. PATENT DOCUMENTS

| | | |
|---|---|---|
| 2007/0139198 A1 | 6/2007 | Shim et al. |
| 2010/0084475 A1* | 4/2010 | Hata .................. G06K 19/0701 |
| | | 235/492 |
| 2010/0253315 A1 | 10/2010 | Nehrig et al. |
| 2012/0032785 A1 | 2/2012 | Kamata |
| 2017/0134015 A1* | 5/2017 | Papananos ............. H03K 5/134 |

FOREIGN PATENT DOCUMENTS

| | | |
|---|---|---|
| JP | 2003085506 A | 3/2003 |
| JP | 2006238693 A | 9/2006 |
| JP | 2010108486 A | 5/2010 |
| JP | 2012053866 A | 3/2012 |
| WO | 2007069211 A1 | 6/2007 |

OTHER PUBLICATIONS

Lee et al., "A Fully Integrated High Security NFC Target IC Using 0.18μm CMOS process," 2011 Proceedings of the ESSCIRC (ESSCIRC), pp. 551-554, Institute of Electrical and Electronics Engineers, New York, New York (2011).

* cited by examiner

METHOD AND DEVICE FOR RADIO FREQUENCY VOLTAGE LIMITING

CROSS-REFERENCE TO RELATED APPLICATION

This application claims priority to Singapore Patent Application No. 10201607275Y, filed on Sep. 1, 2016, which is hereby incorporated by reference in its entirety.

FIELD OF INVENTION

The embodiments of the invention relate to radio frequency (RF) voltage limiting, specifically, a method and device for near-field communication front-end radio frequency voltage limiting.

BACKGROUND

A near-field communication (NFC) or radio frequency identification (RFID) system is a short range communication with a typical communication distance of up to 4 cm. Different from those far-field communication systems using electromagnetic transmission, NFC uses magnetic field coupling for data exchange.

Under a wide magnetic field dynamic range from 0.15 A/m up to 12 A/m, a NFC device front-end is under voltage range from less than 1V to a few tens of volts without RF limiting. For reliability and normal operation, a RF limiter is required to limit the RF input voltage of the NFC device to below 3.6V within the thick gate device's reliable operation range. At the same time, amplitude shift keying (ASK) modulation defined in NFC standards for both transmitter and receiver requires the RF limiter to be linear such that the ASK modulated signals at the NFC front-end will not be distorted.

In general, the RF limiter is required to have fast response, i.e. very short time constant, to protect the NFC device, at the same time it is required to have a slow response, i.e. a very long time constant, for not distorting the ASK modulated signal at the NFC device front-end.

A typical conventional analog limiter adopts a large on-chip capacitor for slow response to reduce distortion to ASK modulation. However, this solution may cause reliability risks due to slow response, e.g. the NFC device may be damaged due to slow response and may extend the settlement time when the field strength changes fast. Further, the conventional analog limiters can only work at active/power-up mode, cannot provide protection during power-off mode.

It is therefore desirable to provide a RF limiter which can both maintain integrity of the ASK modulated signals and protect the NFC device from being damaged due to slow response.

SUMMARY OF INVENTION

Embodiments of the invention provide a solution for RF voltage limiting of NFC device-front end to both maintain the integrity of ASK modulated signals at the NFC front-end and protect the NFC device from being damaged due to slow response.

According to one aspect of the invention, a device for RF voltage limiting is provided. An RF limiter comprises: an analog limiter, a sensing circuit, a digital controller and a digital limiter, wherein the analog limiter is configured to limit a voltage of a RF input to a predetermined safe range during power-off or power-up until a disable control signal is received from the digital controller, and provide a shunting current and a limiting voltage to the sensing circuit;

the sensing circuit is configured to sense a plurality of shunting currents provided by the analog limiter in sequence, determine a value of each bit of a preset current sensing code based on a corresponding sensed shunting current, and send the generated value of each bit to the digital controller, and configured to sense the limiting voltage provided by the analog limiter after the value of each bit of the preset current sensing code has been determined, compare the sensed limiting voltage with a plurality of predetermined reference voltage ranges, generate a voltage comparison signal based on the comparison results and send the generated voltage comparison signal to the digital controller;

the digital controller is configured to generate a control bit based on the value of each bit of the preset current sensing code to control the digital controller to perform RF limiting function by a corresponding limiting unit, determine which voltage range the limiting voltage provided by the analog limiter is within based on the voltage comparison signal, and send a disable control signal to the analog limiter if the limiting voltage is within a predetermined acceptable voltage range;

the digital limiter is configured to perform RF limiting function by a corresponding limiting unit therein based on the control bit received from the digital controller.

According to another aspect of the invention, a method for RF voltage limiting is provided, the method comprises:

limiting, by an analog limiter, a voltage of a RF input to a predetermined safe range during power-off or power-up;

sensing, by a sensing circuit, a plurality of shunting currents provided by the analog limiter in sequence, determining a value of each bit of a preset current sensing code based on a corresponding sensed shunting current, each bit corresponding to a predetermined reference current value, and sending the generated value of each bit to the digital controller;

generating, by the digital controller, a control bit based on the value of each bit of the preset current sensing code to control the digital limiter to perform RF limiting function by a corresponding limiting unit;

sensing, by the sensing circuit, a limiting voltage provided by the analog limiter after the value of each bit of the preset current sensing code has been determined, comparing, by the sensing circuit, the sensed limiting voltage with a plurality of predetermined reference voltage ranges, generating a voltage comparison signal based on the comparison results and sending the generated voltage comparison signal to the digital controller;

determining, by the digital controller, the limiting voltage provided by the analog limiter based on the voltage comparison signal, generating a disable control signal if the limiting voltage is within a predetermined acceptable voltage range, and sending the generated disable control signal to the analog limiter, stopping, by the analog limiter, limiting the voltage of the RF input after receiving the disable control signal from the digital controller.

With the device and method for RF limiting provided by embodiments of the invention, the NFC device can be protected during both power on and power-off mode since an analog limiter with fast response is used to provide device protection at power up period and an on-chip rectifier included in the analog limiter enables the device protection even at power-off mode. At the same time, the integrity of ASK modulated signals at the NFC front-end can be maintained because a digital limiter is controlled by a digital controller to take over the RF limiting function after power on. During data communication with a reader device, the digital limiter is in operation which provides RF limiting function but does not cause distortion to ASK modulated signals, i.e. the performance of ASK receiver will not be sacrificed.

BRIEF DESCRIPTION OF THE DRAWINGS

The embodiments of the invention will be described in detail with reference to the accompanying drawings, in which.

DETAILED DESCRIPTION OF EMBODIMENTS OF THE INVENTION

Figure 1:
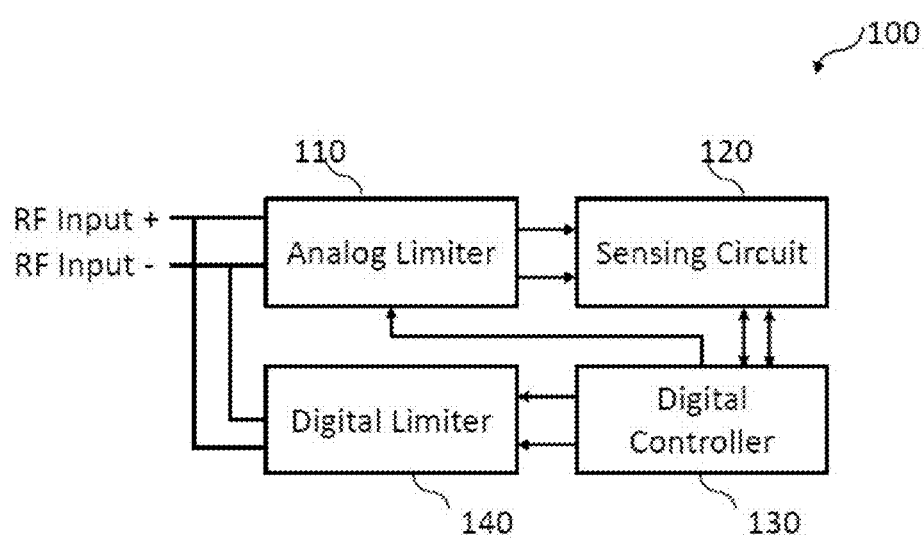
FIG. 1 is a block diagram illustrating the RF limiter according to one embodiment of the invention.

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only, and is not intended to limit the scope of the invention. In the drawings, like reference numerals refer to same or similar functionalities or features throughout the several views.

Embodiments of the invention provide a solution for RF limiting. This solution makes use of the advantages of both analog limiter and digital limiter to overcome the shortcomings in existing RF limiters. The analog limiter with fast response is used to protect the RF limiting device during power up period, or an abnormal operation scenario under a very large field strength. On-chip rectifier is used to convert RF to DC to supply the analog limiter, which enables the protection even at power-off mode. The digital limiter is used to take over the protection when the digital logics start to perform the RF limiting function after power on. During data communication with a reader device, the digital limiter is in operation which provides protection but does not cause distortion to ASK modulated signals.

FIG. 1 is a block diagram illustrating the RF limiter 100 according to one embodiment of the invention. Referring to FIG. 1, the RF limiter 100 includes an analog limiter 110, a sensing circuit 120, a digital controller 130 and a digital limiter 140.

The Analog Limiter 110 is configured to limit a voltage of a RF input to a predetermined safe range, e.g. less than 3.6 volts, during power-off or power-up until a disable control signal is received from the digital controller 130, and provides a shunting current and a limiting voltage to the sensing circuit 120.

The sensing circuit 120 is configured to sense a plurality of shunting currents provided by the analog limiter 110 in sequence, determine a value of each bit of a preset current sensing code based on a corresponding sensed shunting current, and send the generated value of each bit to the digital controller 130.

The sensing circuit 120 is also configured to sense the limiting voltage provided by the analog limiter 110 after all of the bits of the preset current sensing code are determined, compare the sensed limiting voltage with a plurality of predetermined reference voltage ranges, and generate a voltage comparison signal based on the comparison results and send the generated voltage comparison signal to the digital controller 130.

The digital controller 130 is configured to generate a control bit based on value of each bit of the preset current sensing code to control the digital controller 140 to perform RF limiting function by a corresponding limiting unit, and also configured to determine which voltage range the limiting voltage provided by the analog limiter 110 is within based on the received voltage comparison signal, and send a disable control signal to the analog limiter 110 if the limiting voltage is within a predetermined acceptable voltage range.

The digital limiter 140 is configured to perform RF limiting function by a corresponding limiting unit therein based on the control bit received from the digital controller 130.

Figure 2:
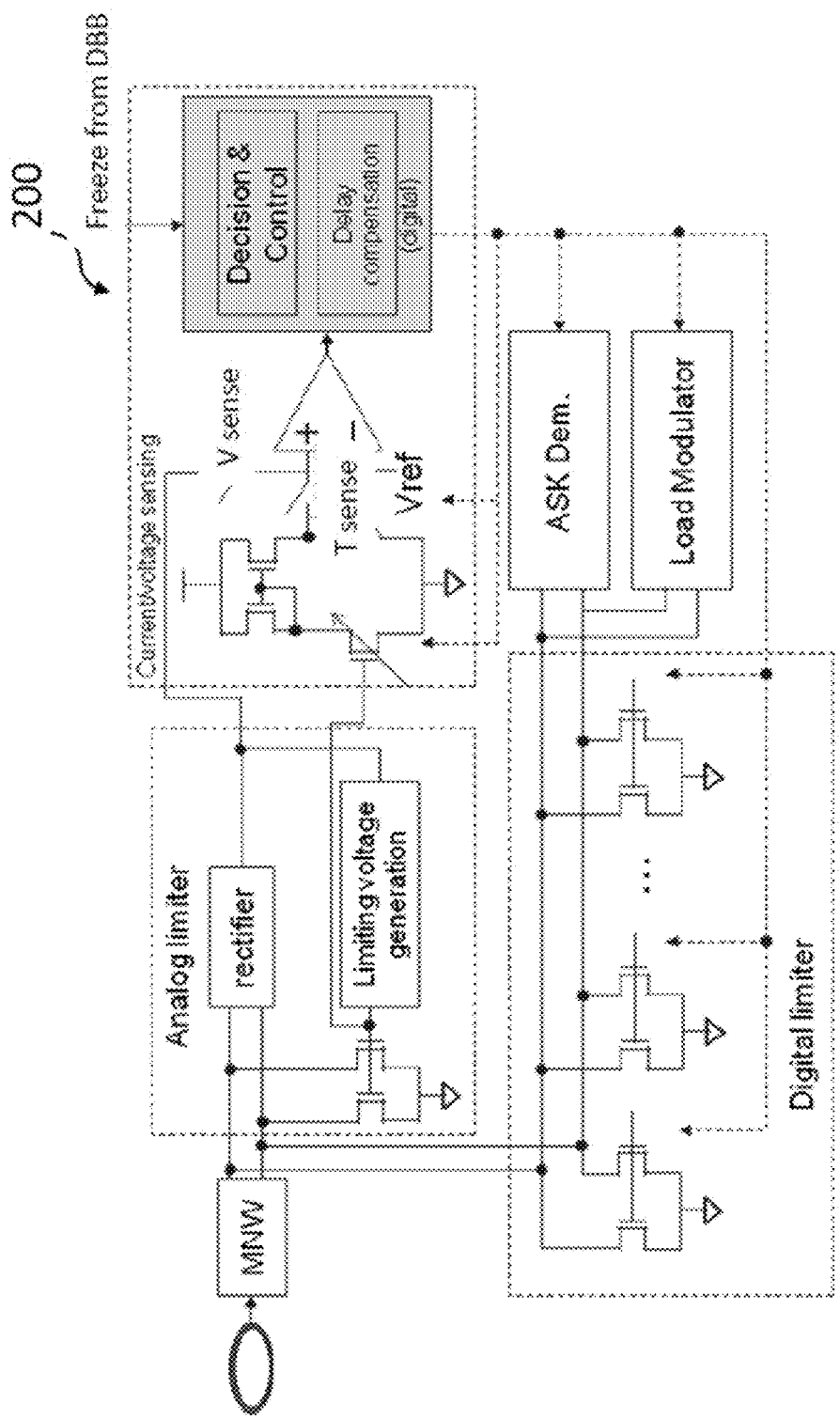
FIG. 2 is a block diagram illustrating the detailed structure of each components of the RF limiter in FIG. 1 according to one embodiment of the invention.

FIG. 2 is a block diagram illustrating the detailed structure of each component of the RF limiter 100 in FIG. 1 according to one embodiment of the invention.

Referring to FIG. 2, the Analog Limiter 110 includes a rectifier which is connected to the sensing circuit 120 to provide the amplitude of input signal, i.e. the limiting voltage, to the sensing circuit 120, two transistors configured to limit a voltage of a RF input to a predetermined safe range during power-off or power-up and a limiting voltage generation unit which is configured to provide the plurality of shunting currents in sequence to the sensing circuit 120, and disable the analog limiter 110 if the disable control signal is received from the digital controller 130. As shown in FIG. 2, the limiting voltage generation unit is connected to gates of the two transistors at the input to provide a plurality of shunting currents to ground in sequence and connected to the sensing circuit 120 to provide the plurality of shunting currents to the sensing circuit 120, and disable the analog limiter 110 if the disable control signal is received from the digital controller 130. Each of the shunting currents reflects the magnetic field strength at the input, which is mirrored in a replica circuits and converted to voltage in the sensing circuit 120 to measure the shunting current.

The sensing circuit 120 includes a current-sensing circuit part, a voltage-sensing circuit part and a comparator with a sensing circuit input terminal and a reference input terminal.

The current-sending circuit part is configured to sense the plurality of shunting currents provided by the analog limiter 110 in sequence, and provide each of the sensed shunting currents to the sensing circuit input terminal of the comparator.

Figure 3:
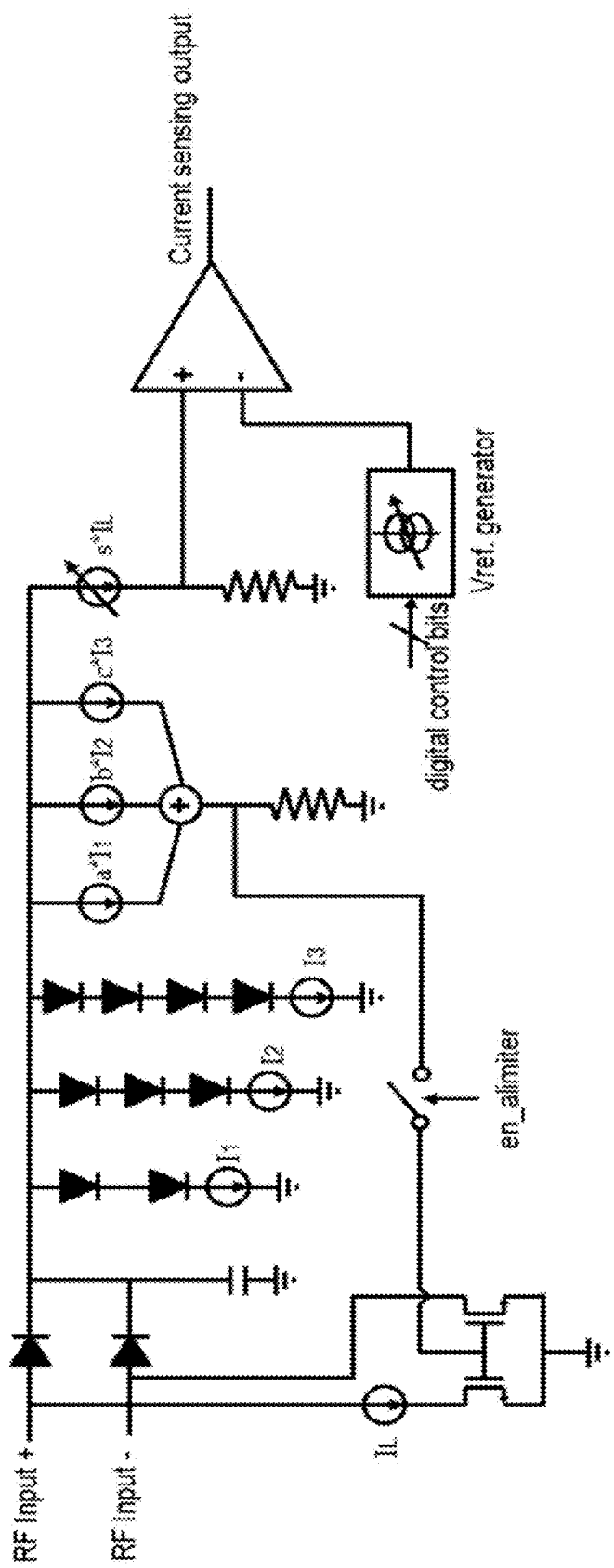
FIG. 3 is a circuit diagram illustrating a detailed structure of the current-sending circuit part of the sensing circuit according to one embodiment of the invention.

FIG. 3 is a circuit diagram illustrating a detailed structure of the current-sensing circuit part according to one embodiment of the invention. In this circuit, the comparator is also shown to show the connection between the current-sensing circuit part and the comparator. The current-sensing circuit part is configured to use a successive approximation loop to sense the plurality of shunting currents provided by the analog limiter 110 in sequence and provide each of the sensed shunting currents to the sensing circuit input terminal of the comparator.

Figure 4:
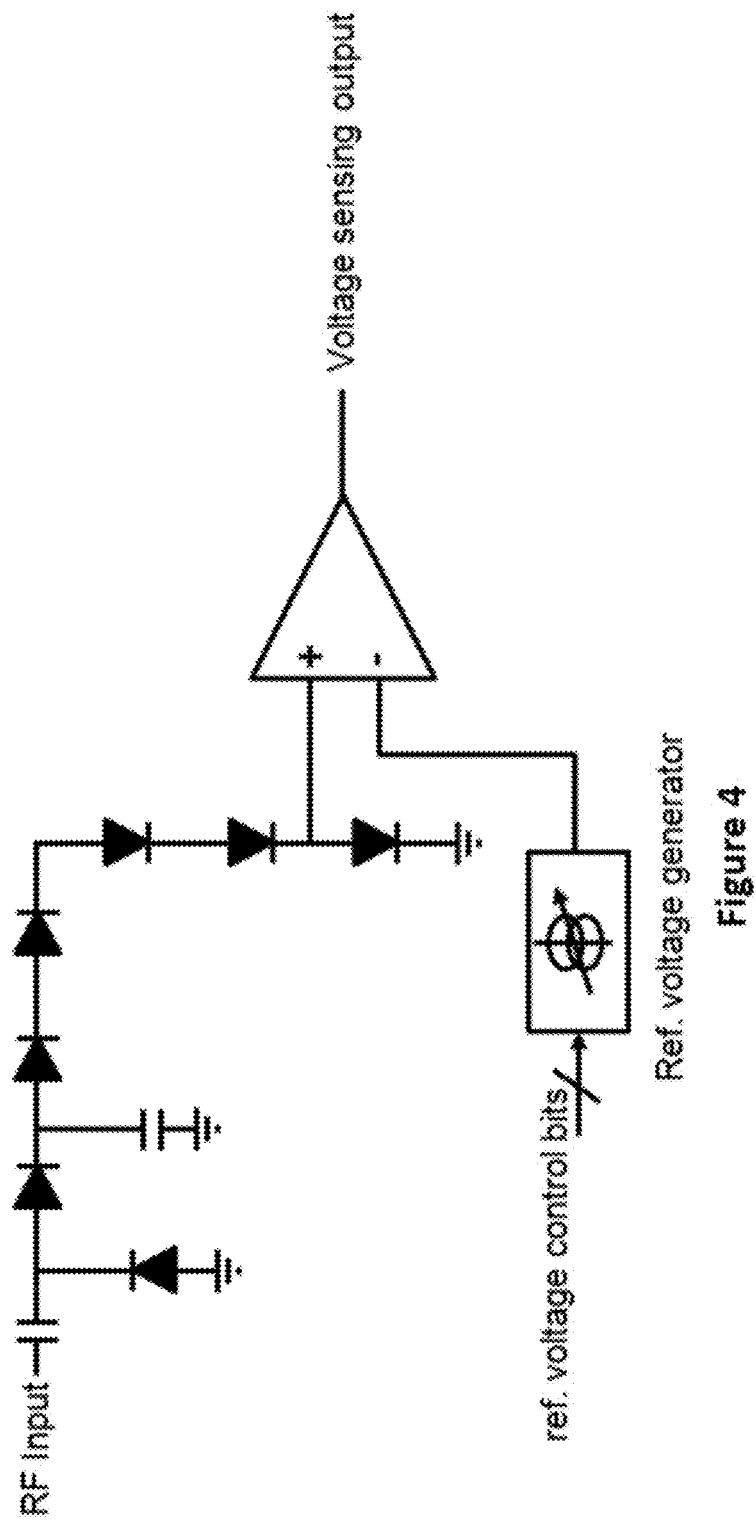
FIG. 4 is a circuit diagram illustrating a detailed structure of the voltage-sensing circuit part of the sensing circuit according to one embodiment of the invention.

The voltage-sensing circuit part is configured to sense the limiting voltage provided by the analog limiter 110, and provide the sensed limiting voltage to the sensing circuit input terminal of the comparator. FIG. 4 is a circuit diagram illustrating a detailed structure of the voltage-sensing circuit part according to one embodiment of the invention.

The comparator is configured to determine a value of each bit of a preset current sensing code based on a corresponding sensed shunting current, and send the generated value of each bit to the digital controller 130, and also configured to compare the limiting voltage with a plurality of predetermined reference voltage ranges, and generate a voltage comparison signal based on the comparison results and send the generated voltage comparison signal to the digital controller 130.

In one example, the comparator is further configured to determine the value of each bit of the preset current sensing code based on a comparison result between the corresponding sensed shunting current and a corresponding predetermined reference current value. In this example, each bit of the preset current sensing code corresponds to a predetermined reference current value. The adjustment of the corresponding predetermined reference current value is controlled by the digital controller 130. The digital controller is further configured to control adjustment of the corresponding predetermined reference current value based on a next bit of the preset current sensing code to be determined by the Sensing Circuit.

In another example, the comparator is further configured to determine the value of each bit of the preset current sensing code based on a comparison result between a corresponding predetermined ratio of the corresponding sensed shunting current and a predetermined reference current value. In this example, the predetermined reference current value is a fixed value, and each bit of the preset current sensing code corresponds to a predetermined ratio of the corresponding sensed shunting current. The adjustment of the corresponding predetermined ratio is controlled by the digital controller 130. The digital controller is further configured to control adjustment of the corresponding predetermined ratio of the corresponding sensed shunting current based on a next bit of the preset current sensing code to be determined by the sensing circuit.

Referring to FIG. 3, the comparator further comprises a reference current value generator connecting to the reference input terminal of the comparator, configured to adjust the corresponding predetermined reference current value based on a current value adjustment control signal from the digital controller.

Referring to FIG. 4, the comparator further comprises a reference voltage value generator connecting to the reference input terminal of the comparator, configured to adjust the predetermined reference voltage ranges provided to the reference input terminal based on a voltage value adjustment control signal from the digital controller.

In the embodiment shown in FIG. 2, the function of the digital controller 130 may be performed by a decision and control module, i.e. the decision and control module is configured to generate a control bit based on value of each bit of the preset current sensing code to control the digital limiter 140 to perform RF limiting function by a corresponding limiting unit, and also configured to determine which voltage range the limiting voltage provided by the analog limiter 110 is within based on the voltage comparison signal, and send a disable control signal to the analog limiter 110 if the limiting voltage is within a predetermined acceptable voltage range.

The digital controller 130 may be further configured to determine whether the sensed limiting voltage matches with a predetermined "knee point", and if the sensed limiting voltage does not match with the predetermined "knee point" due to the process and temperature variation, control the analog limiter 110 to adjust at least one parameter of the analog limiter 110, e.g. the current to voltage ratio in the limiting voltage generation module, to adjust the limiting voltage to make sure it matches with the predetermined "knee point". This function may be performed by a calibration unit preset in the digital controller 130 in one example.

The digital controller 130 may be further configured to obtain from a preset lookup table including a sensitivity control value, frame delay timing (FDT) control value and a load modulation control value based on the sensed voltage and send the obtained values to a ASK modulation unit to control ASK modulation and demodulation. The preset lookup table maintains a plurality of mappings, each between a voltage value and a group of control parameters including but not limited to a sensitivity control value, a frame delay timing (FDT) control value and a load modulation control value.

The digital controller 130 may be further configured to control the ASK modulation unit to compensate a delay caused by the RF limiting process. This function may be performed by a delay compensation unit preset in the digital controller 130 as shown in FIG. 2.

Figure 5:
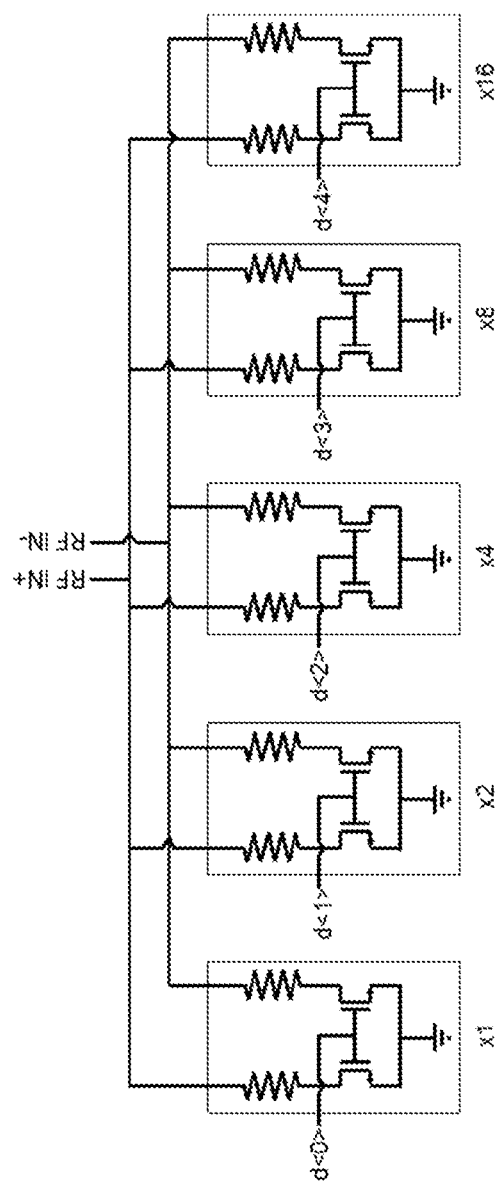
FIG. 5 shows a detailed structure of the digital limiter according to one embodiment of the invention.

As shown in FIG. 2, the digital limiter 140 includes an array of limiting units for performing RF limiting function. Each limiting unit corresponds to a control bit generated by the digital controller 130 and accordingly corresponds to a predetermined reference current value, or a predetermined ratio of the sensed shunting current. FIG. 5 shows an example of the digital limiter according to one embodiment of the invention. In this digital limiter, there are five limiting units x1, x2, x4, x8, and x16. Each of the limiting units corresponds to a predetermined reference current value, or a predetermined ratio of the sensed shunting current.

Figure 6:
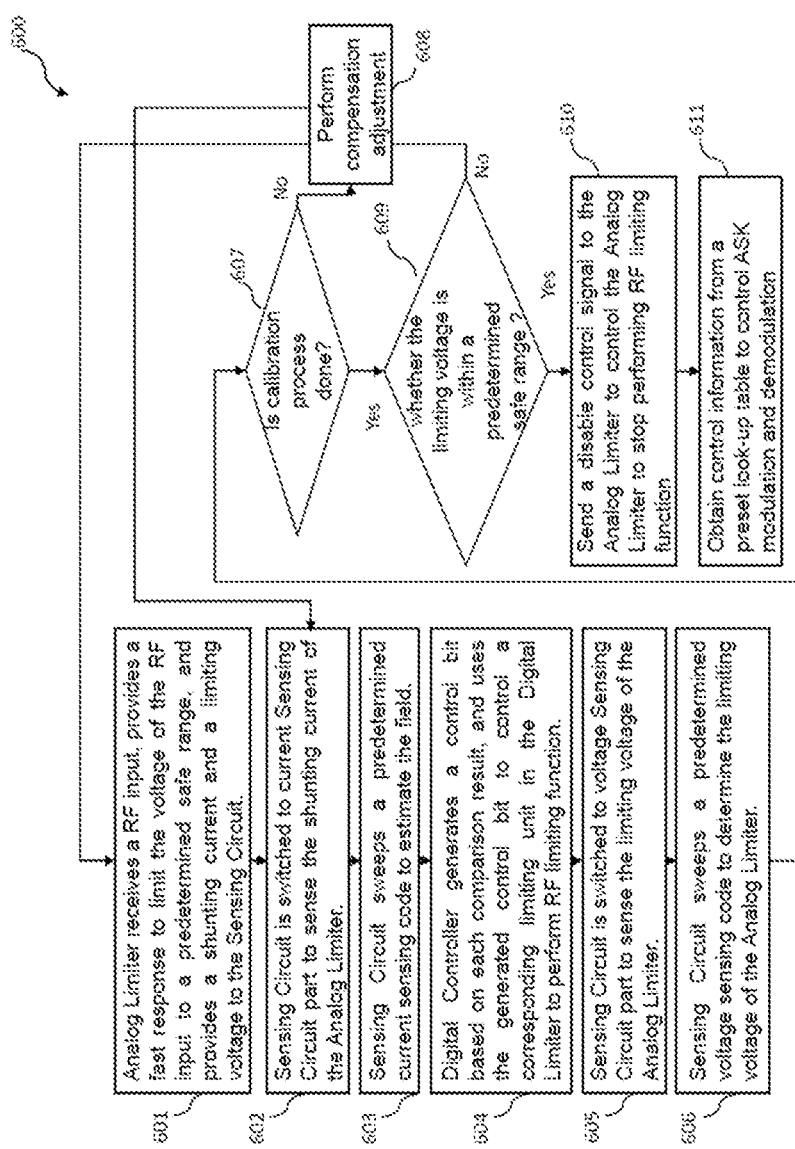
FIG. 6 is a flow chart illustrating the method for NFC front-end RF limiting according to one embodiment of the invention.

FIG. 6 is a flow chart illustrating the method for RF limiting according to one embodiment of the invention.

In Block 601, the analog limiter 110 receives a RF input, provides a fast response to limit the voltage of the RF input to a predetermined safe range during power-off or power-up, e.g. less than 3.6 V, and provides a shunting current and a limiting voltage to the sensing circuit 120.

In Block 602, the sensing circuit 120 is switched to current-sensing circuit part to sense a shunting current of the analog limiter 110.

In Block 603, the sensing circuit 120 sweeps a predetermined current sensing code to estimate the field.

Specifically, the sensing circuit 120 senses a plurality of shunting currents provided by the analog limiter 110 in sequence and determines a value of each bit of the preset current sensing code.

In one example, the preset current sensing code may include 5 bits (b1, b2, b3, b4, b5), each bit corresponds to a predetermined reference current value. For example, b1 corresponds to 100 mA, b2 corresponds to 50 mA, b3 corresponds to 25 mA, b4 corresponds to 12.5 mA, b5 corresponds to 6.25 mA. In this example, a successive approximation loop is used by the sensing circuit 120 to sense the plurality of shunting currents provided by the analog limiter 110. This loop includes 5 steps to determine the values of the 5 bits of the preset current sensing code, i.e. the comparison results. If the comparator of the sensing circuit 120 determines that the shunting current is equal to or more than the predetermined reference current value, the comparison result, i.e. the value of the corresponding bit of the current sensing code may be set as 1, otherwise, if the shunting current is less than the predetermined reference current value, then the comparison result may be set as 0.

In another example, the preset current sensing code may include 5 bits ($b_1$, $b_2$, $b_3$, $b_4$, $b_5$), each bit corresponds to a predetermined ratio of the corresponding sensed shunting current. For example, $b_1$ corresponds to $\frac{1}{16}$, $b_2$ corresponds to $\frac{1}{8}$, $b_3$ corresponds to $\frac{1}{4}$, $b_4$ corresponds to $\frac{1}{2}$, $b_5$ corresponds to 1. The predetermined reference current value is 6.25 mA. In this example, a successive approximation loop is used by the sensing circuit 120 to sense the plurality of shunting currents provided by the analog limiter 110. This loop includes 5 steps to determine the values of the 5 bits of the preset current sensing code, i.e. the comparison results. If the comparator of the sensing circuit 120 determines that the corresponding predetermined ratio of the sensed shunting current is equal to or more than the predetermined reference current value, the comparison result, i.e. the value of the corresponding bit of the current sensing code may be set as 1, otherwise, if the corresponding predetermined ratio of the sensed shunting current is less than the predetermined reference current value, then the comparison result may be set as 0.

In Block 604, the digital controller 130 generates a control bit based on each comparison result, i.e. the value of each bit of the current sensing code determined by the sensing circuit 120 and uses the generated control bit to control a corresponding limiting unit in the digital limiter 140 to perform RF limiting function. The corresponding limiting unit has a current value proportional to the predetermined reference current value corresponding to the bit of the predetermined current sensing code.

In the example mentioned above, the digital controller 130 will generate five control bits ($c_1$, $c_2$, $c_3$, $c_4$, $c_5$), each control bit is generated based on value of the corresponding bit of the current sensing code, $c_1$ corresponds to $b_1$, $c_2$ corresponds to $b_2$, $c_3$ corresponds to $b_3$, $c_4$ corresponds to $b_4$, $c_5$ corresponds to $b_5$. Each control bit corresponds to a limiting unit in the digital limiter 140. The control bit $c_1$ corresponds to the limiting unit X1 of the digital limiter 140; $c_2$ corresponds to the limiting unit X2 of the digital limiter 140; $c_3$ corresponds to the limiting unit X4 of the digital limiter 140; $c_4$ corresponds to the limiting unit X8 of the digital limiter 140; $c_5$ corresponds to the limiting unit X16 of the digital limiter 140. The digital controller 130 can use the control bits to control the corresponding limiting unit in the digital limiter 140 to perform the RF limiting function.

In Block 605, the sensing circuit 120 is switched to the voltage-sensing circuit part to sense the limiting voltage of the analog limiter 110.

In Block 606, the sensing circuit 120 sweeps a preset voltage sensing code to determine the limiting voltage of the analog limiter 110.

Specifically, the sensing circuit 120 senses the limiting voltage of the analog limiter 110 and determines value of each bit of the preset voltage sensing code. In one example, the preset voltage sensing code includes 8 bits ($v_1$, $v_2$, $v_3$, $v_4$, $v_5$, $v_6$, $v_7$, $v_8$), each bit corresponds to a predetermined voltage range. The comparator in the sensing circuit 120 compares the limiting voltage of the analog limiter 110 with each of the predetermined voltage range to determine which voltage range the limiting voltage is within.

In Block 607, optionally, the digital controller 130 checks whether a process calibration has been done, if no, the flow chart proceeds to block 609, if yes, the flow chart proceeds to block 610.

In Block 608, optionally, the digital controller 130 compares the determined limiting voltage of the analog limiter 110 with a predetermined "knee point". If the determined limiting voltage does not match the "knee point", it means the amplitude of the RF signal after limiting is not within expected predetermined value due to process and temperature variation. The digital controller 130 controls the analog limiter 110 to adjust at least one parameter of the analog limiter 110 to adjust the limiting voltage to make sure it matches with the predetermined "knee point". Then, the flow chart goes back to the block 601.

In Block 609, the digital controller 130 determines whether the limiting voltage is within a predetermined safe range and whether the limiting voltage matches with the sensed shunting current to determine whether the current limiting status needs to be updated. If yes, the flow chart proceeds to block 610, if no, the flow chart proceeds to block 601 to go through the process again to update the RF limiting parameters to the optimum one.

In Block 610, the digital controller 130 sends a disable control signal to the analog limiter 110 to control the analog limiter 110 to stop performing RF limiting function.

In Block 611, the digital controller 130 obtains from a preset lookup table, a sensitivity control value, frame delay timing (FDT) control value and a load modulation control value based on the sensed voltage and send the obtained values to a ASK modulation unit to control ASK modulation and demodulation. The preset lookup table maintains a lot of mapping between a voltage value and a series control parameters including a sensitivity control value, frame delay timing (FDT) control value and load modulation control value. Then, the flow chart proceeds back to block 607.

From block 607, the digital controller 130 keeps monitoring whether the sensed voltage is within the safe range. If the sensed voltage is within the predefined safe range, the digital controller 130 will not take any action to the RF limiting blocks. If the sensed voltage is beyond the predefined safe range, which means the magnetic field strength has changed (probably due to the distance between a NFC tag and a NFC reader has changed, which is normal during the operation), the RF limiter has to be updated to response the change. As the digital controller runs at a high speed clock, the response is very fast (within 1 uS) to protect the device.

As will be appreciated from the above, embodiments of the invention provide a RF limiter and a method for RF limiting by this RF limiter. This RF limiter includes both an analog limiter and a digital limiter. No large on-chip capacitor is required to limit the RF. The analog limiter with fast response can provide protection to the RF limiter at power up period. Further, The analog limiter includes an on-chip rectifier for converting RF to DC to supply the analog limiter, which enables the protection even at power-off mode. By sensing the shunting currents and limiting voltage provided by the analog limiter, the digital limiter is controlled by the digital controller to take over the RF limiting function after power on. During data communication with a reader r device, the digital limiter is in operation which provides RF limiting function but does not cause distortion to ASK modulated signals, i.e. the performance of ASK receiver will not be sacrificed. Moreover, the digital processing provided by the digital limiter makes it flexible to dynamically adjust the RF limiter with the change of field strength and the digital part is easy to migrate to advanced process technology. The field strength and the RF signal amplitude, i.e. the limiting voltage provided by the analog limiter, are real time monitored and used to optimize the front-end circuits for best performance, e.g. the sensitivity of the ASK receiver and the switching impedance of the load modulator. Additionally, the calibration process is added to minimize the process variation of the RF limiter.

It is to be understood that the embodiments and features described above should be considered exemplary and not restrictive. Many other embodiments will be apparent to those skilled in the art from consideration of the specification and practice of the invention. The scope of the invention should, therefore, be determined with reference to the appended claims, along with the full scope of equivalents to which such claims are entitled. Furthermore, certain terminology has been used for the purposes of descriptive clarity, and not to limit the disclosed embodiments of the invention.

What is claimed is:

1. A device for radio frequency (RF) voltage limiting, the device comprising: an analog limiter, a sensing circuit, a digital controller and a digital limiter, wherein
    the analog limiter is configured to limit a voltage of an RF input to a predetermined safe range during power-off or power-up until a disable control signal is received from the digital controller, and provide a shunting current and a limiting voltage to the sensing circuit;
    the sensing circuit is configured to sense a plurality of shunting currents provided by the analog limiter in sequence, determine a value of each bit of a preset current sensing code based on a corresponding sensed shunting current, send the generated value of each bit to the digital controller, sense the limiting voltage provided by the analog limiter after the value of each bit of the preset current sensing code has been determined, compare the sensed limiting voltage with a plurality of predetermined reference voltage ranges, generate a voltage comparison signal based on the comparison results and send the generated voltage comparison signal to the digital controller;
    the digital controller is configured to generate a control bit based on the value of each bit of the preset current sensing code to control the digital limiter to perform RF limiting function by a corresponding limiting unit, determine which voltage range the limiting voltage provided by the analog limiter is within based on the voltage comparison signal, and send a disable control signal to the analog limiter when the limiting voltage is within a predetermined acceptable voltage range; and
    the digital limiter is configured to perform the RF limiting function by the corresponding limiting unit based on the control bit received from the digital controller.

2. The device according to claim 1, wherein the sensing circuit includes a current-sensing circuit part, a voltage-sensing circuit part and a comparator with a sensing circuit input terminal and a reference input terminal,
    wherein the current-sensing circuit part is configured to sense the plurality of shunting currents provided by the analog limiter in sequence, and provide each of the sensed shunting currents to the sensing circuit input terminal of the comparator;
    the voltage-sensing circuit part is configured to sense the limiting voltage provided by the analog limiter, and provide the sensed limiting voltage to the sensing circuit input terminal of the comparator; and
    the comparator is configured to determine a value of each bit of a preset current sensing code based on a corresponding sensed shunting current, send the generated value of each bit to the digital controller, compare the limiting voltage with a plurality of predetermined reference voltage ranges, generate a voltage comparison signal based on the comparison results and send the generated voltage comparison signal to the digital controller.

3. The device according to claim 2, wherein the comparator is further configured to determine a value of each bit of a preset current sensing code based on a comparison result between a corresponding sensed shunting current and a corresponding predetermined reference current value, wherein each bit of the preset current sensing code is associated with a different predetermined reference current value controlled by the digital controller; and
    the digital controller is further configured to control adjustment of the corresponding predetermined reference current value based on a next bit of the preset current sensing code to be determined by the sensing circuit.

4. The device according to claim 2, wherein the sensing circuit is further configured to determine a value of each bit of a preset current sensing code based on a comparison result between a corresponding predetermined ratio of a corresponding sensed shunting current and a predetermined reference current value, wherein each bit of the preset current sensing code is associated with a different predetermined ratio controlled by the digital controller; and
    the digital controller is further configured to control adjustment of the corresponding predetermined ratio of the corresponding sensed shunting current based on a next bit of the preset current sensing code to be determined by the sensing circuit.

5. The device according to claim 2, wherein the comparator further comprises a reference current value generator connecting to the reference input terminal of the comparator, configured to adjust the corresponding predetermined reference current value based on a current value adjustment control signal sent from the digital controller.

6. The device according to claim 2, wherein the comparator further comprises a reference voltage value generator connecting to the reference input terminal of the comparator, configured to adjust the predetermined reference voltage ranges provided to the reference input terminal based on a voltage value adjustment control signal sent from the digital controller.

7. The device according to claim 1, wherein the digital controller is further configured to determine whether the sensed limiting voltage matches with a predetermined knee point, and when the sensed limiting voltage does not match with the predetermined knee point, control the analog limiter to adjust at least one parameter of the analog limiter to shift the sensed limiting voltage to match with the predetermined knee point.

8. The device according to claim 1, wherein the digital controller is further configured to obtain from a preset lookup table, a sensitivity control value, frame delay timing (FDT) control value and a load modulation control value based on the sensed limiting voltage and send the obtained values to an amplitude shift keying (ASK) modulation unit to control ASK modulation and demodulation.

9. The device according to claim 1, wherein the analog limiter includes a rectifier connected to the sensing circuit and configured to provide the limiting voltage to the sensing circuit, two transistors configured to limit a voltage of a radio frequency (RF) input to a predetermined safe range during power-off or power-up, and a limiting voltage generation unit connected to the sensing circuit to provide the plurality of shunting currents in sequence to the sensing circuit, and disable the analog limiter if the disable control signal is received from the digital controller.

10. A method for radio frequency (RF) voltage limiting, implemented by a device including an analog limiter, a sensing circuit, a digital controller and a digital limiter, the method comprising:

limiting, by the analog limiter, a voltage of an RF input to a predetermined safe range during power-off or power-up;

sensing, by the sensing circuit, a plurality of shunting currents provided by the analog limiter in sequence, determining a value of each bit of a preset current sensing code based on a corresponding sensed shunting current, each bit associated with a predetermined reference current value, and sending the generated value of each bit to the digital controller;

generating, by the digital controller, a control bit based on the value of each bit of the preset current sensing code to control the digital controller to perform RF limiting function by a corresponding limiting unit;

sensing, by the sensing circuit, a limiting voltage provided by the analog limiter after the value of each bit of the preset current sensing code has been determined; comparing, by the sensing circuit, the sensed limiting voltage with a plurality of predetermined reference voltage ranges, generating a voltage comparison signal based on the comparison results and sending the generated voltage comparison signal to the digital controller;

determining, by the digital controller, the limiting voltage provided by the analog limiter based on the voltage comparison signal, generating a disable control signal when the limiting voltage is within a predetermined acceptable voltage range, and sending the generated disable control signal to the analog limiter; and stopping, by the analog limiter, limiting the voltage of the RF input after receiving the disable control signal from the digital controller.

11. The method according to claim 10, wherein determining the value of each bit of the preset current sensing code further comprises:

determining a value of each bit of a preset current sensing code based on a comparison result between a corresponding sensed shunting current and a corresponding predetermined reference current value, wherein each bit of the preset current sensing code is associated with a different predetermined reference current value controlled by the digital controller;

wherein the method further comprises: controlling, by the digital controller, adjustment of the corresponding predetermined ratio of the corresponding sensed shunting current based on a next bit of the preset current sensing code to be determined by the sensing circuit.

12. The method according to claim 11, further comprising:

adjusting, by the sensing circuit, the corresponding predetermined reference current value based on a current value adjustment control signal sent from the digital controller.

13. The method according to claim 11, the method further comprising:

adjusting, by the sensing circuit, the predetermined reference voltage range provided to a reference input terminal based on a voltage value adjustment control signal sent from the digital controller.

14. The method according to claim 10, wherein determining the value of each bit of the preset current sensing code further comprises:

determining a value of each bit of a preset current sensing code based on a comparison result between a corresponding predetermined ratio of a corresponding sensed shunting current and a predetermined reference current value, wherein each bit of the preset current sensing code associated with a different predetermined ratio controlled by the digital controller;

wherein the method further comprises: controlling, by the digital controller, adjustment of the corresponding predetermined ratio of the corresponding sensed shunting current based on a next bit of the preset current sensing code to be determined by the digital controller.

15. The method according to claim 10, further comprising:

determining, by the digital controller, whether the sensed limiting voltage matches with a predetermined knee point; and when the sensed limiting voltage does not match with the predetermined knee point, controlling, by the digital controller, the analog limiter to adjust at least one parameter of the analog limiter to shift the sensed limiting voltage to match with the predetermined knee point.

16. The method according to claim 10, further comprising:

obtaining, by the digital controller, from a preset lookup table, a sensitivity control value, a frame delay timing (FDT) control value and a load modulation control value based on the sensed limiting voltage and sending the obtained values to an amplitude shift keying (ASK) modulation unit to control ASK modulation and demodulation.

* * * * *

UNITED STATES PATENT AND TRADEMARK OFFICE
CERTIFICATE OF CORRECTION

PATENT NO.        : 10,498,136 B2
APPLICATION NO.   : 15/692799
DATED             : December 3, 2019
INVENTOR(S)       : Chen et al.

Page 1 of 1

It is certified that error appears in the above-identified patent and that said Letters Patent is hereby corrected as shown below:

In the Claims

Claim 13, Column 12, Line 14: "The method according to claim 11, the method further comprising" should read -- The method according to claim 11, further comprising --.

Signed and Sealed this
Fourth Day of May, 2021

Drew Hirshfeld
*Performing the Functions and Duties of the
Under Secretary of Commerce for Intellectual Property and
Director of the United States Patent and Trademark Office*